Aug. 13, 1963  J. H. HETT  3,100,482
FLEXIBLE OPTICAL SURGICAL INSTRUMENT
Filed April 14, 1961  3 Sheets-Sheet 1

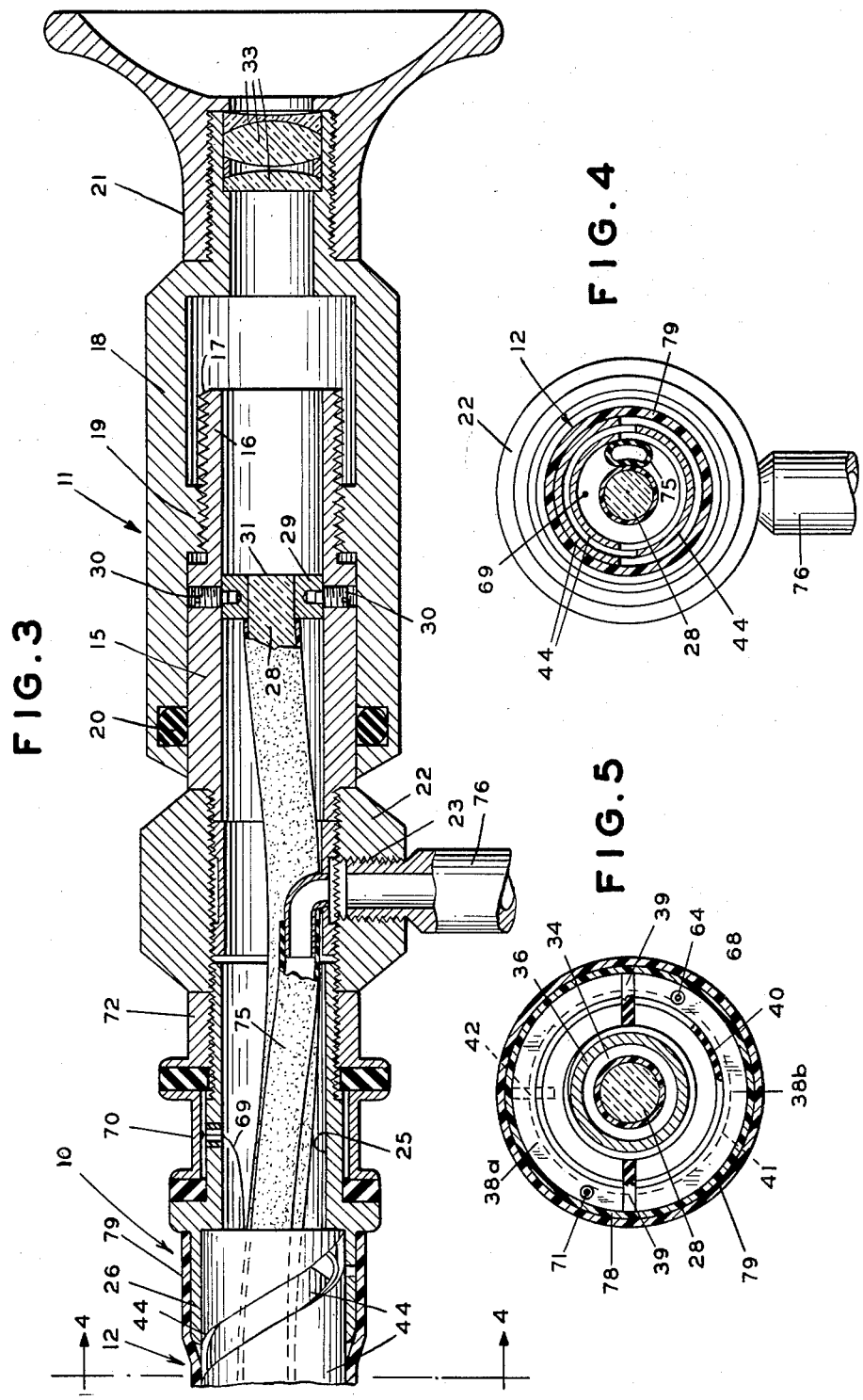

Aug. 13, 1963  J. H. HETT  3,100,482
FLEXIBLE OPTICAL SURGICAL INSTRUMENT
Filed April 14, 1961  3 Sheets-Sheet 3

United States Patent Office 3,100,482
Patented Aug. 13, 1963

3,100,482
FLEXIBLE OPTICAL SURGICAL INSTRUMENT
John H. Hett, Cresskill, N.J., assignor to American Cystoscope Makers, Inc., Pelham Manor, N.Y., a corporation of New York
Filed Apr. 14, 1961, Ser. No. 103,003
3 Claims. (Cl. 128—6)

This invention relates to a flexible optical instrument and more particularly to a flexible surgical instrument especially well suited for complete visualization of the large intestine from the rectum to the caecum, without the performance of surgical procedures involving the cutting of an opening into the body of the patient.

Instruments have long been desired which could be inserted into an opening in the body of a patient without the need for performing any surgery and which would permit precise visualization and diagnosis of hitherto inaccessible areas and organs within the patient's body. In my co-pending patent application, Serial No. 85,040, filed January 26, 1961, assigned to the assignee of my present application and of which by present application is a continuation-in-part, there is set forth a flexible optical instrument which is particularly adapted for use in visualizing the ureter and portions of the kidney. While access to the large intestine is more readily attainable than in the case of the ureter and the kidney, the peristaltic motion of the intestine creates a special problem when visualization of the interior of the intestine is attempted. Furthermore, the sharp curvature at both the left and right colic flexures require an instrument having a great degree of flexibility over a working length of about five and one half feet.

It is, therefore, a principal object of this invention to provide a compact, highly flexible surgical optical instrument by means of which the inner surface of the large intestine may be visualized from end to end thereof, the image provided being characterized by a high degree of brightness and good definition.

A further object is to provide such an instrument in which the distal viewing end is flexibly joined to a remote eyepiece assembly and is readily maintained centered in the intestine and is not dislodged by the peristaltic motion of the intestine.

Yet another object of the present invention is to provide such an instrument by means of which an image of an entire annular segment of the intestine, throughout 360° thereof, is presented to the viewer.

Another object of the present invention is to provide such an instrument in which the viewing head at the distal end of the instrument is maintained in position in the intestine in spite of its peristaltic motion and by which illumination and visualization of an area forward of the viewing head is provided.

In accordance with one feature of the present invention, an inflatable bag is provided on the viewing head of the instrument by means of which the viewing head may be maintained positioned with the objective lens centered in the intestine.

In one embodiment of the present invention, a panoramic lens is provided which affords a view throughout 360° of the interior of a section of the intestine. The image formed by the panoramic lens is carried by an image carrier in the form of an elonagted flexible image conductor which may be several feet in length and which optically interconnects the viewing head at the distal end of the instrument with the eyepiece assembly at the proximal end of the instrument. A lamp supported on the forward or distal side of the panoramic lens serves to illuminate the area under view, the image of which is passed through the panoramic lens to the end of the image conductor which is made up of a very large number of extremely small diameter, light conducting, flexible fibers.

In another embodiment of the present invention, in addition to the flexible image conductor, a flexible light conductor is provided for carrying the light from a remote, high intensity light source, along the interior of the instrument to illuminate the area viewed through the elongated flexible image conductor.

The foregoing as well as additional objects and advantages of the present invention will be apparent from the following description of preferred embodiments of the present invention and the accompanying drawings in which:

FIGURE 3 is a cross sectional view, also on an enlarged scale taken through the line 3—3 of FIGURE 1;

FIGURE 4 is a sectional view taken through the line 4—4 of FIGURE 3;

Figure 1:
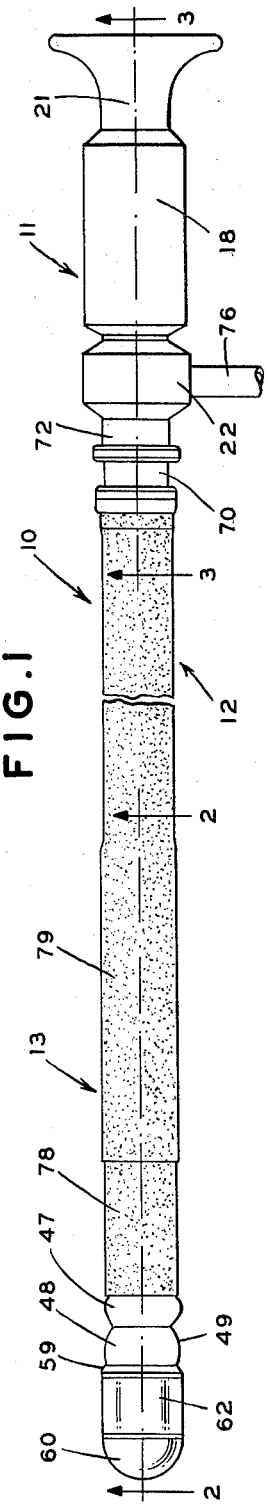
FIGURE 1 is an elevational veiw of an instrument constructed in accordance with the present invention.
Figure 2:
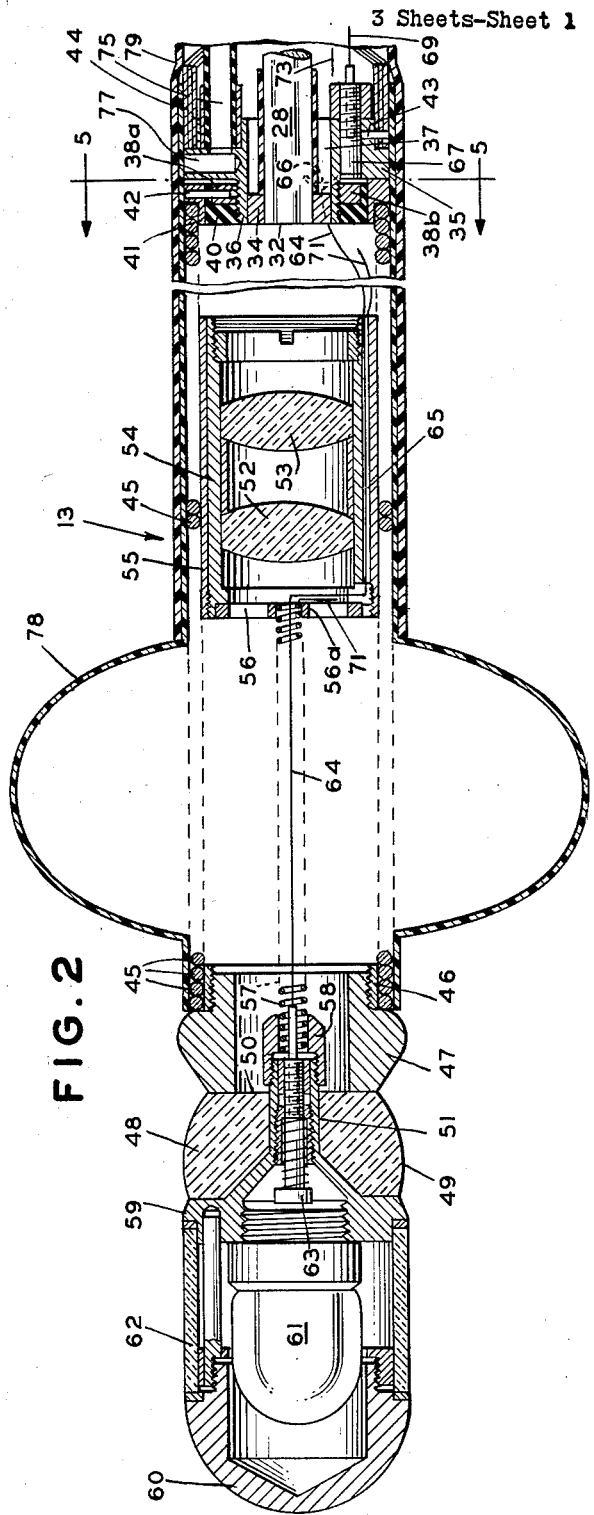
FIGURE 2 is a cross sectional view on an enlarged scale taken through the line 2—2 of FIGURE 1.
Figure 6:
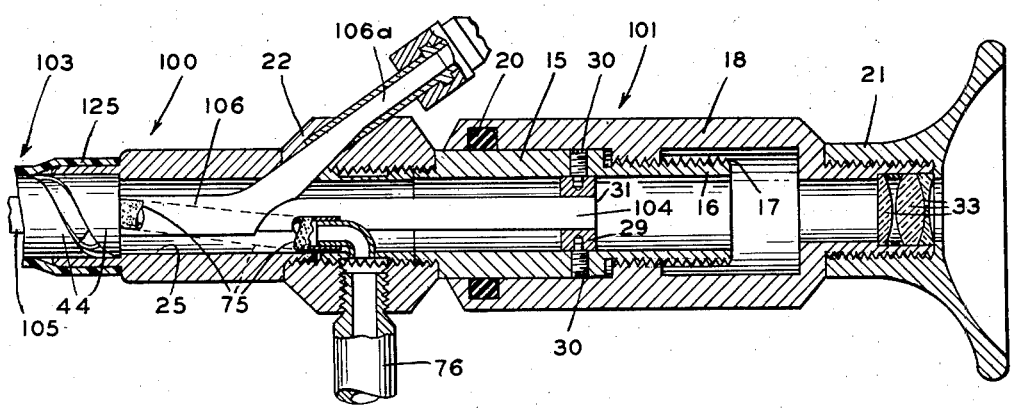
Figure 7:
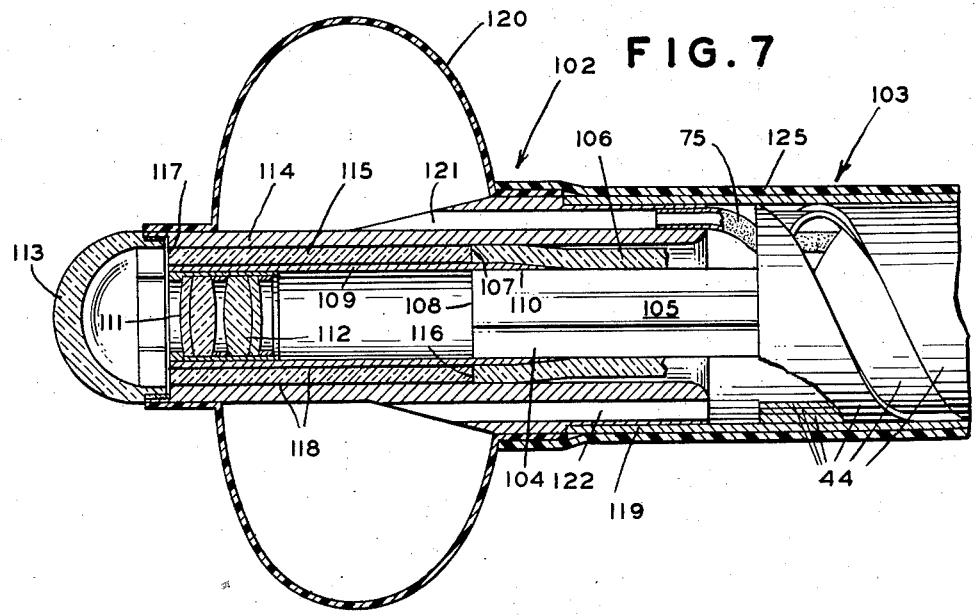

FIGURE 5 is a sectional view taken along the line 5—5 of FIGURE 2 in the direction indicated; and FIGURES 6 and 7 are views, similar to FIGURES 1 and 2 respectively of another embodiment of the present invention.

Instruments constructed in accordance with the present invention may be successfully utilized to traverse and visualize the entire interior of the large intestine. For the purpose of exemplifying the present invention, it will now be described in connection with instruments constructed for the purpose of visualizing the large intestine over its entire length in the body of a human patient. However, it is to be noted that instruments constructed in accordance with the present invention are useful for, among other things, examining other remote portions of the human body.

Referring now to the drawing in detail, flexible surgical instrument 10 comprises an eyepiece assembly 11 joined to one end, the proximal end of an elongated flexible tubular assembly 12 which in turn terminates in and is joined to an objective or head assembly indicated generally at 13.

As is most clearly shown in FIGURE 3, eyepiece assembly 11 comprises a generally tubular body member 15 having an externally threaded portion 16 of reduced diameter at its proximal end. An eyepiece rotor 18, having an internally threaded portion 19 engaging the threaded portion 17, extend in telescoping relation over the body member 15; an O-ring 20 seated in an annular recess formed in the rotor 18 adjacent to its distal end providing a sliding seal with the outer surface of the body member 15. An eyepiece 21 is fitted to the end of the rotor 18 for axial movement therewith when the rotor is rotated relative to the body member 15.

An internally threaded collar 22, having a pair of tapped openings 23 and 24 formed therethrough for a purpose yet to be described, serves to connect the threaded distal end of the body member 15 to the proximal end of a rotary contact support member 25 which terminates at its distal end in a sleeve 26 of reduced diameter.

An elongated optical fiber bundle 28 enclosed in thin walled flexible sheath preferably formed of latex, extends through the support member 25. At its proximal end, the fiber bundle 28 is fitted with a collar 29 and set screws 30 serve to anchor centrally this end of the fiber bundle within the body member 15.

Optical fiber bundle 28 functions in the present embodiment as an image conductor and for this purpose is made up of a large number of extremely small diameter light conducting fibers tightly packed together to form a generally cylindrical array approximately one quarter of an inch in diameter. The image conductor 28 may be manufactured as described in the co-pending application of Lawrence E. Curtiss, filed on December 19, 1960, Serial No. 76,868. As thus manufactured, the image conductor 28 comprises an extremely large number, 75,000 to 100,000 or more, extremely fine glass-coated optical glass fibers which extend continuously from end to end of the image conducting bundle. The end faces 31 (FIGURE 3) and 32 (FIGURE 2) are optically polished. The ends of the fibers are mutually oriented in each of the ends of the fiber bundle 28 so that an image formed on the end face 32 is presented at the end face 31 where it may be viewed by a suitable magnifying lens system represented by the lenses 33 mounted in the eyepiece rotor 18.

At its distal end, the image conducting bundle 28 is fitted with a collar 34 and secured centrally within a connector 35. Preferably connector 35 is formed of an insulative material such as Teflon and serves to interconnect the various parts forming the flexible tubular assembly 12 and the objective or head assembly 13.

Connector 35, as shown most clearly in FIGURE 2, is generally in the form of an annular disc having a portion 36 of reduced diameter projecting therefrom, the connector 35 being formed with a central axially extending passageway 37 extending therethrough in which the distal end of the image conductor 28 is clamped as has been described. The connector portion 36 is externally threaded to receive a contact assembly comprising a split contact ring, the two halves of which are designated as 38a and 38b and are spaced and insulated from each other by means of insulators 39 (FIGURE 5). An insulating ring 40 which is generally L-shaped in cross section is seated against the split contact ring members 38a, 38b and is in turn enclosed about its periphery by annular junction ring member 41 which is locked to and conductively connected with contact member 38a by means of a conductive pin 42 which extends through the intermediate portion of the insulator ring 40.

The elongated flexible tubular assembly 12 may be approximately five to six feet or more in length and may be so flexible as to require rigidification in order to facilitate insertion and manipulation within the body of a patient. In the embodiment now being described, flexible assembly 12 incorporates three flexible spiral members 44, formed of stainless steel or other suitable material, along the common axis of which the image conducting bundle 28 extends. At one end thereof, the spiral members 44 are anchored to the connector 35 by pin 43 while at their opposite ends the spirals are connected to the support sleeve 26. In the present instance the three spiral members 44 extend one within the other, the outermost member 44 having somewhat greater thickness than the inner two, and with the opposite ends of the members 44 secured together and anchored they are capable of transmitting substantial torque without impairing the desired degree of flexibility. While three spiral members have been described and shown in FIGURE 3, only one such member may be satisfactorily used in some instances. Furthermore, the desired degree of rigidification while preserving the overall flexibility of the instrument may also be attained by means of other instrumentalities such as a flexible thin walled tube formed of polyvinyl chloride which may be used to enclose the image conductor 28 as well as the remaining members which extend from the eyepiece assembly 11 to the head assembly 13.

A flexible support member 45 in the form of a spirally wound metallic spring serves to support the head assembly members and connect them to connector 35. For this purpose, the spring 45 is connected at one end thereof to junction ring member 41 while the opposite end thereof is secured to a collar 46 which is in turn connected to a tubular support member 47. A panoramic lens 48 is cemented to the distal end of the tubular support member 47 with the latter engaging only the peripheral portion of the lens.

Lens 48 is of the type which is capable of providing an image of a 360° field presented to its circumferential face 49 by directing the light rays axially through its end face 50 and axially along the members 47 and 45. The 360° annular image is undisturbed by the presence of a central axially extending aperture 51 formed through the lens 48.

The image presented by the annular end face 50 of the panoramic lens 48 is received by lenses 52 and 53 and focused on the end face 32 of the image conducting bundle 28. Lenses 52 and 53 are supported within a lens housing 54 carried in a sleeve 55 which is in turn mounted within the spring 45.

Spider 56 is positioned in the forwardly presented or distal end of the lens housing 54 and has a central support ring 56a to which one end of an electrical conductor in the form of an elongated spirally wound spring 57 is connected. The other end of the spring 57 is connected to a sleeve 58 formed of brass or other suitable conductive material and which is in turn connected to a portion of the socket of a lamp housing 59 which extends through the panoramic lens aperture 51. Lamp housing 59 comprises a cap 60 the internal surface of which functions in part as a reflector for light from a lamp 61 which passes out through the clear fused quartz circular window 62 of the housing. The lamp 61 is threaded into the socket of the housing 59 and has a central contact which engages spring biased contact member 63 which in turn is conductively connected to an insulated wire 64. As is most clearly shown in FIGURE 2, wire 64 extends axially along the spring 57, through the support ring 56a and a slot 65 formed between lens housing 54 and sleeve 55. Wire 64 also extends through a hole 68 (FIGURE 5) formed through insulative ring 40 and split contact ring member 38b where it is connected to ear 66 of one of two similar contact members 67 carried by connector 35. The contact member 67 which is connected to conductor 64, is connected through an insulated wire conductor 69 extending along the flexible tubular assembly 12 to an annular contact member 70 insulatively supported on the support member 25.

The ground return path for current supplied to the lamp 61 is through the spring 57, an insulated wire conductor 71 and the second contact member 67 (not shown) supported by the connector 35 and to which insulated wire 73 is connected. Wire 73 may be connected directly to annular contact surface 72 or the connection may be completed through the spiral members 44.

A flexible tubular conduit 75 formed of latex or other suitable material extends within the spirals 44 throughout the entire length of the flexible assembly 12. As shown in FIGURE 3, the proximal end of tube 75 communicates through the opening 23 formed in collar 22 with a stop-cock fitting 76 or other suitable device adapted for connection to a source of air under pressure. The distal end of the tube 75 is connected to the connector member 35 and communicates through a passageway 77 formed in the latter with the interior of an annular inflatable member 78.

As is most clearly shown in FIGURES 1 and 2, the inflatable member 78 encloses the spring member 45 so as to trap the air within the head assembly 13. All but that portion of the member 78 which it is desired to be inflated is covered by the distal end portion of an external resilient sheath 79 which also serves to enclose tubular assembly 12. Thus, air forced into the instrument along tube 75 passes out of the passageway 77 into the space enclosed by the inflatable member 78 and that portion of the inflatable member 78 which is not enclosed by the external sheath 79 becomes distended to form an enlarged annular shape as shown in FIGURE 2.

The instrument 10 is readily manipulated in use because of, among other things, its extreme flexibility and its compact construction. Those parts of the head assembly which are rigid are short in length, about one inch, and the largest diameter of the head end of the instrument is about ⅝ of an inch. While the instrument may be introduced directly into the patient, it is preferred that a proctoscopic tube having an inner diameter of about one inch be introduced first and then the instrument 10 is fed through the proctoscope which should have sufficient length to straighten out the curves of the pelvic and ileac colons; a sealing member, in the form of a centrally apertured resilient member mounted in the mouth of the proctoscope, providing a sliding seal with the instrument 10 so as to prevent escape of an inflating medium, such as air or water, which is introduced into the intestine through the proctoscope. With the member 78 inflated the panoramic lens 48 is centered in the inflated intestine and the peristaltic motion is compensated for. The 360° and approximately 30° wide zone of view of the lens 48 together with the high degree of flexibility of the instrument makes possible complete visualization of the entire interior of the large intestine. The spring 45 which serves to interconnect the rigid portions of the viewing head assembly 13 with connector 35 makes it possible for the instrument to negotiate the very sharp bends of the right and left colic flexures. Furthermore, this is achieved with a minimum amount of manipulation of the instrument thereby minimizing the amount of discomfort that may be experienced by the patient.

Turning now to FIGURES 6 and 7 of the drawing, surgical instrument 100 is a further embodiment of the present invention constructed so as to be especially well suited for affording forward vision along the interior of the large intestine and comprising an eyepiece assembly 101 joined to an objective or head assembly 102 by a flexible tubular assembly 103 which may be five to six feet or more in length.

Eyepiece assembly 101 is generally somewhat similar in construction to eyepiece assembly 11 shown in FIGURE 3 and in order to avoid unnecessary repetition those parts of eyepiece assembly 101 which are similar to corresponding parts of eyepiece assembly 11 are designated in FIGURE 6 with the same reference character used in FIGURE 3.

The rigidified proximal end of an image conductor section 104 is centrally anchored in the body member 15 as was described in connection with the optical fiber bundle 28. The image conductor section 104 comprises the centrally extending portion of a composite light and image carrier 105 which may be manufactured as described in said Curtiss co-pending application Serial No. 76,868. The light carrier section 106 of the light and image carrier 105 surrounds the major portion of the image conductor section 104. As shown most clearly in FIGURE 6, the optical fibers of the light carrier section 106 are separated from the image section 104 within the eyepiece assembly 101 and are formed as a generally rigid rod-like extension 106a extending at an angle to the image conductor section 104 and out through an opening formed in the wall of the member 22. The external end of the extension 106a is fitted with a female Luer lock connector and its end face is optically polished to provide for the efficient entry of light into the fibers forming the light carrier from a flexible light source similar to that shown and described in my said co-pending application Serial No. 85,040. The fibers forming the light carrier section 106 extend from end to end thereof as in the case of the image conductor section 104 and through the length of the flexible tubular assembly 103 into the head assembly 102 where the fibers of the light carrier section 106 terminate flush with the fibers of the image conductor section 104. Thus, the light carrier section 106 terminates in an annular end face 107 which surrounds and extends in the same plane as the end face 108 of the image carrier. An objective lens holder 109 is formed with a portion 110 of reduced thickness at one end thereof which may be tapered to form a feather edge and which is inserted between the adjacent end portions of the light carrier and image conductor sections, the end portion of the light carrier section being spread somewhat. The objective lens holder 109 supports a pair of spaced lenses 111, 112 mounted to receive an image through the outer generally spherical lens 113 and focus it on the end face 108 of the image carrier.

Lens 113 is mounted in and closes the end of a tubular member 114 in which the distal end of the light and image carrier 105 is received and in which the lens holder 109 is axially positioned. Mounted between the member 114 and the objective lens holder 109 is a glass cylinder 115 having one annular end face 116 in face-to-face contact with the light carrier end face. The opposite end face 117 of the glass cylinder 115 extends substantially in the same plane as the outer end of the lens holder 109 and is presented to the lens 113 for illuminating the field under view through the lens 113 with light received from the light carrier 106. To minimize light loss through the glass cylinder 115, its inner and outer cylindrical surfaces are coated as indicated at 118 with a highly reflective coating of silver or the like.

In operation light entering light carrier section 106a after traveling the length of the fibers forming the light carrier 106, passes into and through the glass cylinder 115 to illuminate the area viewed through the outer lens 113. An image of the illuminated field is focused on the end face 108 of the image carrier and is conducted by the fibers of the image carrier to the proximal end face thereof in the eyepiece assembly 101 where it is viewed through the magnifying and focusing lenses of the eyepiece assembly.

The tubular member 114 is secured to the distal end of a sleeve 119 to which the distal ends of the spiral members 44 are connected. An annular inflatable bag 120 is mounted on and extends about the member 114 and has its interior in communication with one or more channels 121 formed in the wall of the member 114. An air tube 75 may be used to interconnect the channel 121 with the stopcock fitting 76 whereby the bag 120 may be inflated as was described in connection with the inflatable member 78 shown in FIGURE 2. In practice, the interior of the instrument is sealed air tight by an external sheath and the tube 75 may be omitted, the inflating medium introduced through fitting 76 freely passing along the length of the instrument to the inflatable bag 120. Inflation of the bag 120 rather than the external sheath is assured by forming the bag 120 of thinner or less rigid material than the sheath.

As was described in connection with FIGURES 1-3, an external sheath 125 made of thin walled latex tubing or other suitable material is utilized to enclose the tubular assembly 103. The spiral members 44 may be dispensed with when the external sheath 125 is formed of sufficiently rigid material such as polyvinyl chloride which may be in the form of a catheter incorporating one or more channels extending in the wall thereof between its opposite ends. One of such channels may communicate with the interior of an annular inflatable bag formed on the sheath adjacent to the distal end of the head assembly while another channel may communicate through an opening directly with the interior of the intestine.

The terms and expressions which have been employed are used as terms of description and not of limitation, and there is no intention, in the use of such terms and expressions of excluding any equivalents of the features shown and described or portions thereof, but is recognized that various modifications are possible within the scope of the invention claimed.

I claim:

1. A flexible optical instrument particularly for insertion into and for examining the entire interior of the large intestine in the body of a patient, comprising elongated flexible means including an elongated flexible bundle of a very large number of extremely fine light conducting fibers mutually oriented at the opposite end faces of said bundle so that an image presented to the distal end of said bundle is conducted to the proximal end face thereof, resilient means connected adjacent one end thereof to the distal end of said flexible means and adapted to pass the left and right colic flexures, a panoramic lens connected to the distal end of said resilient means, said panoramic lens having an axially extending opening formed therethrough and an annular end face presented toward the distal end of said bundle for providing an image of a 360° field surrounding said panoramic lens, objective lens means, and objective lens holder supporting said objective lens means within said resilient means intermediate said panoramic lens annular end face and the distal end of said bundle, means including a lamp mounted on the distal side of said panoramic lens for illuminating the 360° field around said panoramic lens, means extending axially through the hole in said panoramic lens and connected to said objective lens holder including a resilient member for anchoring said iluminating means, an annular expansible member surrounding said resilient means, means extending along said flexible means and communicating with said expansible member for inflating the latter, and means connected to the proximal end of said flexible means for viewing an image of said field on the proximal end of said bundle.

2. A flexible optical instrument particularly for insertion into and for examining the entire interior of the large intestine in the body of a patient, comprising elongated flexible means including an elongated flexible bundle of a very large number of extremely fine light conducting fibers mutually oriented at the opposite end faces of said bundle so that an image presented to the distal end of said bundle is conducted to the proximal end face thereof, objective lens means including an objective lens and a panoramic lens for focusing an image throughout 360° of an annular field on the distal end face of said bundle, means including a lamp mounted on the distal side of said panoramic lens for illuminating a 360° field presented to said panoramic lens, elongated resilient means, connected at one end thereof to the distal end of said flexible means and connected at its opposite end to said panoramic lens, said elongated resilient means being adapted to pass the left and right colic flexures, inflatable means surrounding said resilient means, means supporting said objective lens within said resilient means intermediate said panoramic lens and the distal end of said bundle, means extending along said flexible means and communicating with said inflatable means for inflating the latter, and means connected to the flexible means for viewing an image of said field on the proximal end of said bundle.

3. A flexible optical instrument particularly for insertion into and for examining the entire interior of the large intestine in the body of a patient, comprising elongated flexible means including an elongated flexible bundle of a very large number of extremely fine light conducting fibers mutually oriented at the opposite end faces of said bundle so that an image presented to the distal end of said bundle is conducted to the proximal end face thereof, objective lens means including a lens means and an objective lens for forming an image of a field and focusing the same on the distal end face of said bundle, means including a lamp mounted on the distal side of said lens means for illuminating the field presented to said lens means, elongated resilient means connected at one end thereof to the distal end of said flexible means and connected at its opposite end to said lens means, said elongated resilient means being adapted to pass the left and right colic flexures, inflatable means surrounding said resilient means, means supporting said objective lens within said resilient means intermediate said lens means and the distal end of said bundle, means extending along said flexible means and communicating with said inflatable means for inflating the latter, and means connected to the flexible means for viewing an image of said field on the proximal end of said bundle.

References Cited in the file of this patent

UNITED STATES PATENTS

| 2,959,089 | Hett | Nov. 8, 1960 |
| 2,975,785 | Sheldon | Mar. 21, 1961 |

FOREIGN PATENTS

| 526,643 | Germany | June 8, 1931 |
| 129,955 | Austria | Oct. 25, 1932 |
| 593,213 | Great Britain | Oct. 10, 1947 |
| 1,059,615 | Germany | June 18, 1959 |

OTHER REFERENCES

Kapany article in the Strong Book, "Concept of Classical Optics," 1958, pages 565–567, published by W. H. Freeman & Co. (Copy in Div. 7.)